United States Patent [19]

Hessler

[11] Patent Number: 5,275,425
[45] Date of Patent: Jan. 4, 1994

[54] LOCKING DEVICE FOR A THREADED CHIPPER RETAINING NUT

[75] Inventor: William K. Hessler, Lockwood, N.Y.

[73] Assignee: Ingersoll-Rand Company, Woodcliff Lake, N.J.

[21] Appl. No.: 892,831

[22] Filed: Jun. 2, 1992

[51] Int. Cl.$^5$ .................................................. B23B 31/08
[52] U.S. Cl. ........................................ 279/90; 279/101; 279/140
[58] Field of Search .................... 279/89, 90, 91, 99, 279/8, 19.6, 100, 101, 140; 408/233

[56] References Cited

U.S. PATENT DOCUMENTS

| | | | |
|---|---|---|---|
| 656,069 | 8/1900 | Weisenhorn | 279/89 |
| 2,999,407 | 9/1961 | Frangesco | 279/89 X |
| 3,489,422 | 1/1970 | Selowitz | 279/89 |
| 3,779,567 | 12/1973 | Boyd | 279/19.1 |
| 4,487,566 | 12/1984 | Barna | 279/91 X |
| 4,496,164 | 1/1985 | Hansson | 279/90 X |

Primary Examiner—Timothy V. Eley
Attorney, Agent, or Firm—Walter C. Vliet

[57] ABSTRACT

A chipper chisel retaining nut is provided with a circular groove in its threads which receives a formed flexible semi-circular spring ring which is inserted in the groove through an aperture formed in the exterior of the nut adjacent the groove as a device for preventing accidental unthreading of the nut.

6 Claims, 3 Drawing Sheets

LOCKING DEVICE FOR A THREADED CHIPPER RETAINING NUT

BACKGROUND OF THE INVENTION

This invention relates generally to means for retaining chisels and the like in impact devices such as, for example, chippers and more specifically to a means for obtaining retainer nuts on chipper barrels by preventing their rotation due to the repeated vibratory action of such devices.

In the past, numerous methods of retaining the retainer nut have been tried including the use of solid pins, clips, sealants, and the like. To date, such methods have proved either ineffective, costly, or time-consuming in application.

The foregoing illustrates limitations known to exist in present threaded chipper retaining nut art. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a locking device for a threaded chipper retainer nut comprising a threaded chipper barrel having a threaded end and an internal bore for receiving a chisel, the threaded end being further provided with a circumferential groove interspaced in the thread; a locking nut for securing the chisel in the bore having a complimentary thread for engaging the threaded end of the chipper barrel and the locking nut is further provided with a complimentary circumferential groove in register with the circumferential groove in a threaded on position thereby forming a circumferential channel between the threaded joint; and a circular formed spring means insertable in the channel as a means for preventing unwanted removal of the locking nut.

The foregoing and other aspects will become apparent from the following detailed description of this invention when considered in conjunction with the accompanying drawing figures.

BRIEF DESCRIPTION OF THE DRAWING FIGURES

DETAILED DESCRIPTION

Figure 1:
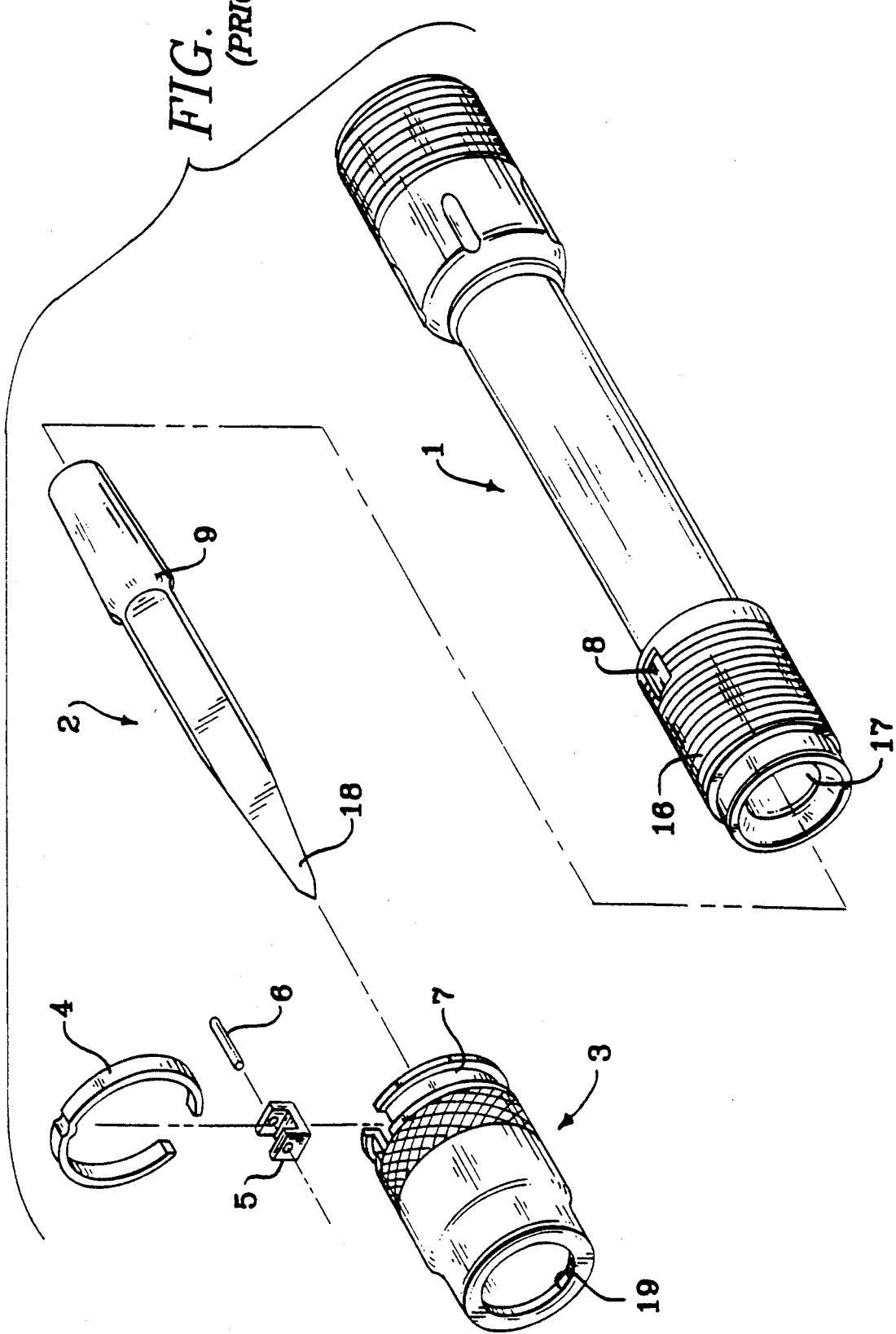
FIG. 1 is an exploded vectorial view showing the primary components of a chipper barrel, chisel, and retaining nut therefor, including a prior art threaded chipper nut retaining nut device involving a split ring pin and pin saddle.
Figure 4:
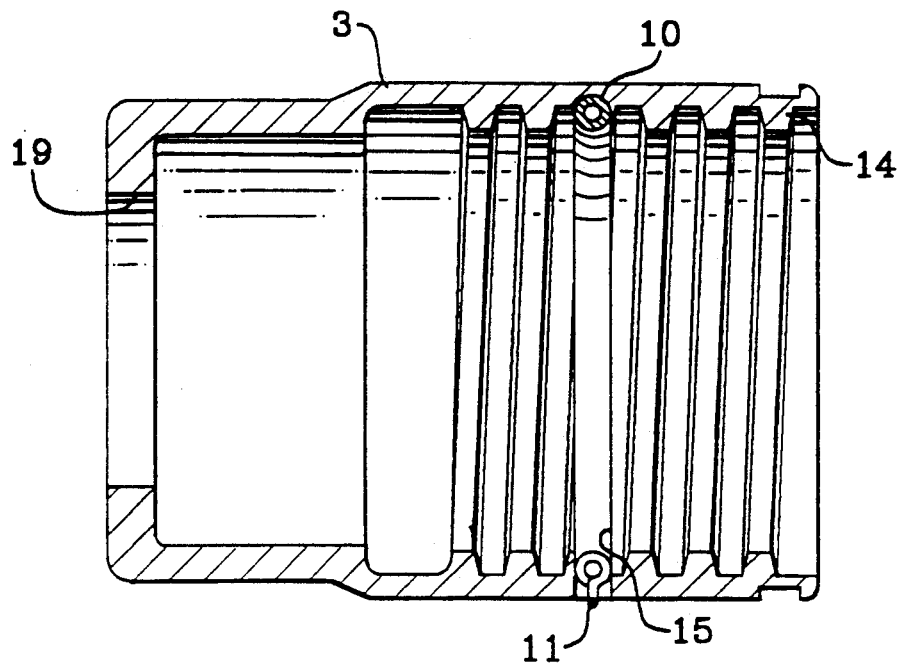
FIG. 4 is a cross section of the chipper retaining nut according to the present invention taken at Section 4—4 of FIG. 3.
Figure 5:
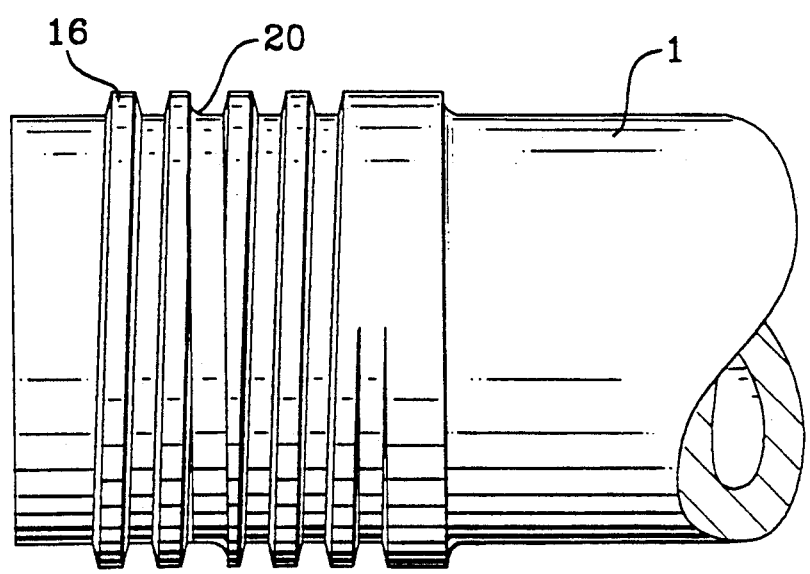
FIG. 5 is a side elevation view of the threaded portion of a chipper barrel according to the present invention.

Referring to FIG. 1, a chisel retaining retention nut and barrel assembly according to the prior art is shown. The chipper barrel generally designated by reference numeral 1 is provided with a threaded end 16 at its one end for cooperation with internal threads 14 of a retaining nut 3 (best seen on FIG. 4).

It should be appreciated that upon assembly the chisel 2 which is provided with a chisel point 18 and a retaining collar 9 protrudes through the chisel port 19 and is partially received within a bore 17 in the chipper barrel 1. The chisel is retained by the retaining nut by virtue of the expanded diameter of the retaining collar 9 cooperating with the reduced diameter of the chisel port 19.

Figure 2:
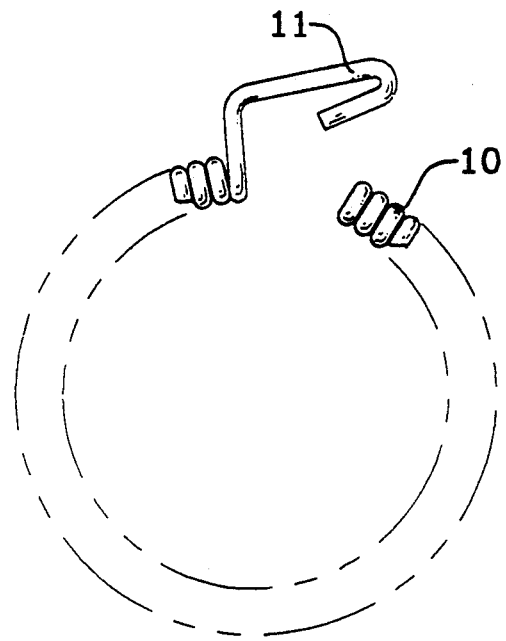
FIG. 2 is an end view of a semi-circular preformed retaining spring clip according to the present invention.
Figure 3:
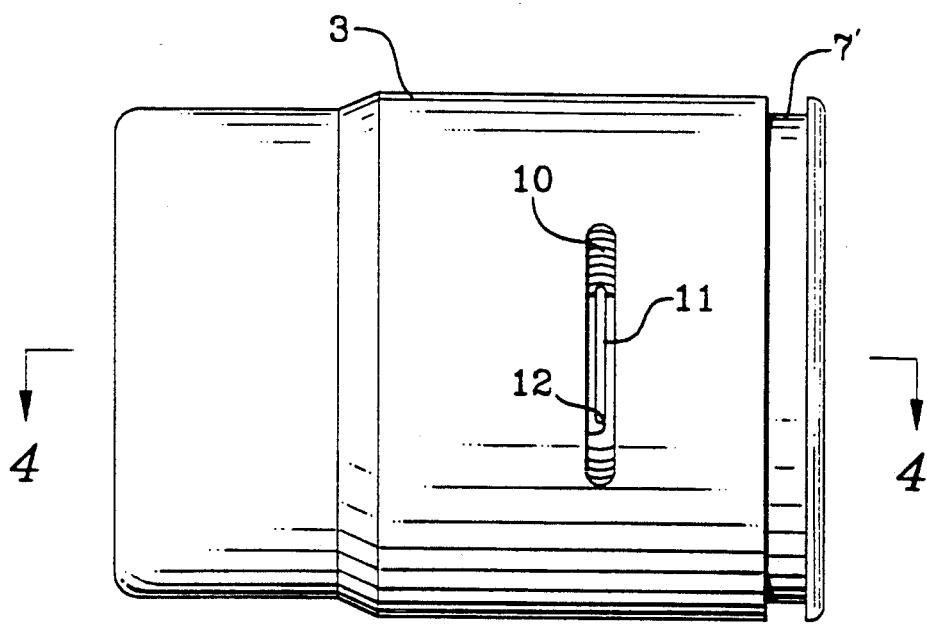
FIG. 3 is a side elevation of a chipper retaining nut according to the present invention.

The diameter of the chisel port 19 may be suitably reduced to the diameter of the chisel point by means of optional bushings which have been omitted in the prior art figure for purpose of simplicity. In the prior art figure (FIG. 1) the retaining nut 3 is further provided with a retainer groove 7 which receives a retainer clip 4 which is secured in place by means of a retainer pin saddle 5 and a retainer pin 6. A saddle pocket 8 receives the retainer pin saddle which prevents the unthreading of the retaining nut. The three piece retainer of the prior art shown has been replaced according to the present invention by an easier to assemble retainer shown in FIG. 2.

The retainer is comprised of a split substantially circular preformed bent spring 10 having a pull hook 11 formed at one end. The retainer spring 10 is inserted (upon threaded assembly of the retainer nut 3 and the chipper barrel 11) through an access slot 12 into a circumferential round channel between the nut and barrel. This is formed by cutting a semi-circular cross section circumferential groove 20 in the chipper barrel I in the midst of the external threads 16 formed thereon and a cooperating similar circumferential groove 15 in the midst of the internal threads 14 of the retaining nut.

When the retaining nut is screwed on to the threads of the barrel to the appropriate point, the circumferential grooves 15 and 20 are in register and cooperate to form the circular circumferential channel into which is inserted the retainer spring 10. The circular form of the retainer spring retains the retainer spring within the circular groove during operation and prevents the unthreading of the retaining nut.

To disassemble the retaining nut, it is simply a matter of grasping the pull hook 11 by appropriate means and pulling the retaining spring out of the circumferential groove through the access slot 12. This results in a user-friendly method of assembling and disassembling the retainer nut and reduces the number of parts required for assembly. The retainer spring is shown as a formed coil spring, however, other suitable materials having similar characteristics may be utilized.

Having described the invention, what is claimed is:

1. A locking device for a threaded chipper retainer nut comprising:
   a threaded chipper barrel having a threaded end and an internal bore for receiving a chisel; said threaded end being further provided with a circumferential groove interspaced in the thread;
   a locking nut for securing said chisel in said bore having a complimentary thread for engaging said threaded end of said chipper barrel and said locking nut is further provided with a complimentary circumferential groove in register with said circumferential groove in a threaded on position thereby forming a circumferential channel between the threaded joint; and a circular formed spring means insertable in said channel as a means for preventing unwanted rotation and unthreaded removal of said locking nut.

2. A locking device for a threaded chipper retainer nut according to claim 1, wherein said channel is further provided with an access opening accessible for insertion and removal of said spring means.

3. A locking device for a threaded chipper retainer nut according to claim 2, wherein said access opening is provided in said locking nut.

4. A locking device for a threaded chipper retainer nut according to claim 1, wherein said circular formed spring means is formed from a coil spring bent into a split semi-circular form.

5. A locking device for a threaded chipper retainer nut according to claim 4, wherein said circular formed spring is further provided with a hook means for providing a grip for ready insertion and retrieval of said spring means from said channel.

6. A circular formed spring means for insertion in a complimentary circumferential channel in a threaded set as a means for preventing unthreading.

* * * * *